United States Patent [19]

Govani et al.

[11] Patent Number: 5,281,271
[45] Date of Patent: Jan. 25, 1994

[54] CEMENT BASED PAINT AND FINISHING COMPOSITION

[75] Inventors: Kishore K. Govani; Bhanu K. Govani, both of Bangalore, India; Ramesh K. Govani, Parsippany, N.J.

[73] Assignee: HITEK Fine Chemicals Pvt. Ltd., Bangalore, India

[21] Appl. No.: 956,359

[22] Filed: Oct. 5, 1992

[51] Int. Cl.$^5$ ............................................. C04B 07/02
[52] U.S. Cl. ..................................... 106/727; 106/713; 106/724; 106/728
[58] Field of Search ............... 106/713, 719, 721, 724, 106/728, 727, 741, 712, 241

[56] References Cited

U.S. PATENT DOCUMENTS

| | | | |
|---|---|---|---|
| 4,069,063 | 1/1978 | Ball | 106/713 |
| 4,081,287 | 3/1978 | Baudouin et al. | 106/713 |
| 4,452,635 | 6/1984 | Noshi et al. | 106/628 |
| 4,762,563 | 8/1988 | Colin | 106/97 |
| 4,838,941 | 6/1989 | Hill | 106/685 |
| 4,943,323 | 7/1990 | Gartner | 106/735 |

*Primary Examiner*—Karl Group
*Assistant Examiner*—Paul Marcantoni
*Attorney, Agent, or Firm*—John A. Haug

[57] ABSTRACT

Cement based finishing compositions are disclosed in which use of portland cement as a binder is significantly reduced without adversely affecting bonding or adhesion and while enhancing coverage of surface area, workability and hiding power or opaqueness. The composition, when mixed with an appropriate amount of water can be applied in a single coating over a primed surface on a masonry, concrete, sand rendering, brick work, cement blocks and the like to give a finished, homogenous surface.

In another embodiment a floor and wall topper composition is disclosed which, when mixed with water at lower than conventional proportions, provides a rock-hard, either jointless or compartmented sections having improved compressive and flexural strength and resistance to wear and tear.

8 Claims, No Drawings

CEMENT BASED PAINT AND FINISHING COMPOSITION

This invention relates generally to cement based paint and finishing compositions and more specifically to materials for use in providing a finish coating for various building surfaces.

BACKGROUND OF THE INVENTION

In conventional cement based paints portland cement is the principal constituent, serving as a binder, and generally comprises over 60%, by weight, of the composition. The cement is blended with lime, up to 25% by weight of the composition, along with an accelerator such as calcium chloride, mineral fillers and coloring agents to form a dry powder. When mixed with water in a 1:1 ratio by volume the mixture forms a slurry which is applied in two or more coats over a primed surface. White cement plus dolomite mixed with water to form a slurry is applied as a primer coat to fill in open pores, cracks and the like of the plastered surface in order to reduce the consumption of the more expensive cement paint in obtaining a complete, smooth, finished layer. Due to the relatively high content of portland cement and relatevely low surface area dependent upon the particle size of the mix, coloring agents/pigments tend to bleed or migrate under weathering effects over a period of time deleteriously affecting the homogeneity of the finish. Since conventional cement paint powders are generally coarse in texture they do not adhere well to smooth plastered surfaces and consequently require an application of liquid cement primer to obtain proper adhesion or bonding on smooth surfaces.

It is an object of the present invention to provide a coating material for masonry type surfaces which does not have the limitations of the prior art as noted above. Another object of the invention is the provision of an improved coating material for use on exterior or interior surfaces of a variety of materials including masonry, concrete, bricks, cement blocks, asbestos cement sheets, gypsum boards and the like which has a homogenous finish. Yet another object is the provision of coating material which has improved covering or hiding properties so that a single application over a primed surface will result in a suitable finish. Still another object is the provision of a coating material with improved dispersion of coloring agents and with minimized or essentially no bleeding or migration.

Conventional mosaic and terrazzo tiles of various dimensions up to 24"×24" are made by blending portland cement, dolomite/calcite powder and mosaic chips in various colors and sizes, eg, 1 to 5 mm in diameter with a typical mix proportion being 1:1.5:2. The required amount of water at a ratio of water to cement of approximately 0.45 is added and the thick slurry is then pressed at about 150 to 200 kg/square cm in hydraulic presses in thicknesses of about 8 to 10 mm as a topper over a base of grey cement-sand mix in thicknesses of about 14 to 16 mm. The pressed tiles are cured with water and steam and finally polished to obtain an even topper surface amd to expose mosaic chips giving a terrazzo type finish.

It is an object of another embodiment of the invention to provide a finishing material system wherein the conventional topper layer can be applied in situ at the site of use and without the need of using high pressures. Yet another object is the provision of an improved finished or topper layer for either compartmented or seemless finishes which is less expensive to produce and yet has increased strength and hardness to make it more durable.

These and other objects, features and advantages of the present invention will become apparent from the following detailed description of the invention.

SUMMARY OF THE INVENTION

Briefly, in accordance with a first embodiment of the invention, a smooth, bright finish using a single application of coating material having a formulation in which a lower percentage of cement is used thereby enabling improved coloring agent/pigment dispersion and minimizing bleeding and migration tendencies. The formulation comprises portland cement, calcium hydroxide and melamine fomaldehyde as binders, magnesium oxide and silicon dioxide as fillers, aluminum stearate and zinc oxide as additives and inorganic synthetic oxides as pigments/coloring agents with a particle size between approximately 63 to 69 microns. According to a feature of the invention a binder to filler ratio by weight of 0.55 provides optimum adhesion, resistance to chalking and a water to dry composition ratio in the range of approximately 1.5:1 to 2.25:1 provides optimum adhesion and resistance to chalking and provides optimum hiding or opaqueness in the range of approximately 1:1 to 2:1.

In accordance with a second embodiment of the invention, the formulation comprises portland cement, calcium hydroxide and melamine formaldehyde as binders, aluminum oxide, aluminum stearate, magnesium oxide and silicon dioxide as fillers, oleic acid or salts thereof as surfactants and inorganic synthetic oxides as pigments/coloring agents with a particle size between approximately 63 to 69 microns. According to a feature of the invention the binder to filler ratio by volume of 0.75 when mixed with water at less than 0.3 water to cement ratio by volume results in high compressive strength with low shrinkage. The formulation can be used as a topper of 2 to 3 mm thick to provide either a jointless or compartmented finish both for floors and walls with enhanced compressive and flexural strength and resistance to wear in a variety of finish types.

DETAILED DESCRIPTION OF PREFERRED EMBODIMENTS

As shown in Table 1, a typical convention cement based paint or finishing material comprises, by weight, 65% portland cement, 5% hydrated lime, 26% calcium carbonate, 1-2% titanium oxide, 0.2-1.5% aluminum stearate and 1-10% coloring agents. This results in a product having a bulk density of 1.2-1.3 grams per cc requiring 2.5 Kg per 100 square feet for coating coverage. A typical coating thickness is in the order 5-7 mm and normally at least two applications are required for adequate coverage. In order to obtain a reasonably smooth surface an additional smoothing operation is required. Use of lime presents environmental problems and causes efforescence and bleeding problems in the finished surface.

TABLE 1

| Prior Art Composition | | Improved Composition | |
| --- | --- | --- | --- |
| portland cement | 65% | portland cement | 12-25% |
| calcium carbonate | 25% | calcium hydroxide | 25-35% |
| hydrated lime | 5% | magnesium oxide | 12-16% |
| titanium oxide | 1-2% | silicon dioxide | 25-32% |
| | | melamine | 0.05-3% |

TABLE 1-continued

| Prior Art Composition | | Improved Composition | |
|---|---|---|---|
| | | formaldehyde | |
| | | zinc oxide | 1-3% |
| aluminum stearate | 0.2-1.5% | aluminum stearate | 0.5-3% |
| coloring agents | 1-10% | coloring agents | 0.5-10% |
| | | water | 2-5% |

In accordance with the invention, and as also shown in Table 1, an improved composition comprises, by weight, 12-25% portland cement, 25-35% calcium hydroxide, 12-16% magnesium oxide with, 25-32% silicon dioxide, 0.05-3% melamine formaldehyde, 1-3% zinc oxide, 0.5-3% aluminum stearate, 2-5% water and 1-10% coloring agents.

All the materials have a particle size between approximately 63-69 microns and are charged together in a conventional grinder cum miller and subjected to approximately 4 to 5 hours of milling, the particle size of the finished material being between approximately 63-69 microns, and are then packed in plastic lined waterproof bags of selected sizes, eg, 2 kg, 10 kg and 20 kg.

The portland cement, calcium hydroxide and melamine formaldehyde serve as binders, magnesium oxide and silicon dioxide as fillers, aluminum stearate and zinc oxide as additives and inorganic synthetic oxides as pigments/coloring agents. The aluminum stearate adds to waterproofing qualities and lubrication to facilitate paint application. Zinc oxide adds to opacity and improves resistance to chalking. Synthetic inorganic oxides are added ranging from approximately 0.5 to 10% depending upon the requirements of shades and colors. For purposes of this invention, resistance to chalking refers to the amount of paint which is rubbed off with one's hand after curing for two days. 100% means that no paint comes off —70% means that when the surface is painted with 1 kg of material 300 grams of paint film will come off in powder.

The bulk density is approximately 0.65-0.75 g/cc with approximately 1 kg required for a coating coverage per 100 square feet as opposed to 2.5—3 kg of conventional cement paint. A typical coating thickness is 2-3 mm and only a single application is required to obtain complete coverage without secondary smoothing operations.

After preparing the site by ensuring that dust and dirt are scraped away using a wire brush and that the surface is free of loose flaky plaster, salts, oil and grease, a primer coat of white cement or other suitable primer material is applied. Then one part water, by volume, is mixed with one and one half parts of the improved composition until a homogenous paste is achieved. Up to another one one part of water, as required, is then added to place the composition in condition as a paint for application by brush, spray or roller, preferably on a wet surface. The surface is then cured with water the following day. Once the water is added the workable life of the coating material is approximately 24 hours.

EXAMPLE 1

A composition was made suitable for light weight coating applications by charging the following materials together and grinding in a conventional industrial ball mill grinder, by weight, 15% portland cement, 30% calcium hydroxide, 13% magnesium oxide, 2% zinc oxide, 2% aluminum stearate until a particle size of approximately 65 microns was obtained. The coverage was approximately 7K cm squared /kg which compared to 3.68 squared /kg. This represents approximately a 40% improvement over conventional materials.

A one kilogram sample of the above composition was tested for area coverage along with one kilogram samples of two conventional commercial cement paints with the results shown in Table 2.

TABLE 2

| COMPOSITION | AREA COVERAGE | NO. OF APPLICATIONS |
|---|---|---|
| PRIOR ART A | 30 SQ FEET | 3 |
| PRIOR ART B | 70 SQ FEET | 2 |
| IMPROVED COMPOSITION | 150 SQ FEET | 1 |

It should be noted that the acceptable range of ingredients for light weight waterproof coating applications is between approximately 12-25% of portland cement and between approximately 25-35% of calcium hydroxide. Cement and calcium hydroxide quantities outside the stated range, either higher of lower, will result in poor setting control, particularly on masonry type surfaces, as well as poor bonding.

Table 3 shows the effect of various binder to filler ratios on adhesion after curing with water for two days, resistance to chalking after curing and opacity or hiding power of one coat on a primed surface. It will be seen that a binder to filler ratio of 0.55 provides excellent adhesion, resistance to chalking and hiding power.

TABLE 3

| Sample No. | Binder to Filler Ratio | Degree of Adhesion | Resistance to Chalking | Hiding Power |
|---|---|---|---|---|
| 1 | 0.4 | poor | 70% | 80% |
| 2 | 0.45 | poor | 80% | 90% |
| 3 | 0.50 | fair | 90% | 100% |
| 4. | 0.55 | excellent | 100% | 100% |

In the above Table 3 the degree of adhesion and resistance to chalking were measured after curing with water for two days and the hiding power is for a single coat over a primed surface.

Table 4 demonstrates the effect of the water ration to dry composition on adhesion and resistance to chalking after curing and on opacity. It will be seen that a water to dry composition ratio in the range of approximately 1.5:1 to 2.25:1 provides excellent adhesion and resistance to chalking and a ration of water to dry composition up to approximately 2:1 provides excellent hiding power.

TABLE 4

| Sample No. | Water to Composition Ratio | Degree of Adhesion | Resistance to Chalking | Hiding Power |
|---|---|---|---|---|
| 1 | 1:1 | poor | 85% | 100% |
| 2 | 1.25:1 | good | 90% | 100% |
| 3 | 1.50:1 | excellent | 100% | 100% |
| 4 | 1.75:1 | excellent | 100% | 100% |
| 5 | 2:1 | excellent | 100% | 100% |
| 6 | 2.25:1 | excellent | 100% | 80% |

The coating composition of the first embodiment of the invention has significantly higher dry volume compared to conventional materials. That is, the volume of 600 grams of the coating composition made in accordance with the invention is equivalent to the volume of 100 grams of conventional cement paint so that a larger area can be covered in a given time thereby saving on labor costs. Further, bags of the improved composition can be stacked without causing lump formations on lower tier sacks sue to the weight of upper tier sacks, a problem in storing conventional materials.

A second embodiment comprises a material particularly suitable for cast in situ flooring or topping material and a one-step finish material to coat over any plastered surface without any secondary applications or operations such as priming or smoothing and can provide various finishes such as simulated marble, terrazzo, smooth, textured and ceramic. The material is an extremely fine dry powder blend of portland cement, non-fadable oxide colors, polymers, lubricants, dispensing aids, brightners and admixtures. Such modified composition is shown in Table 5 and includes, by volume 55-70% portland cement, 13-25% calcium hydroxide, 3-8% silicon dioxide, 2-5% magensium oxide, 0.005-1% melamine formaldehyde, 0.01-0.5% surfactants and 1-10% inorganic oxide coloring agents/pigments. In this composition any variation outside the 55-70% cement range will result in shrinkage variations during curing and will cause cracking of the finished surface. The content of the portland cement in the lower portion of the stated range provides a thicker paste which has approximately 15-20% lower viscosity providing better flow characteristics facilitating application on vertical surfaces such as walls.

TABLE 5

| | |
|---|---|
| white portland cement | 55-70% |
| calcium hydroxide | 13-25% |
| silicon dioxide | 3-8% |
| aluminum oxide | 1-4% |
| aluminum stearate | 1-3% |
| magnesium oxide | 2-5% |
| melamine formaldehyde | 0.005-1% |
| surfactants | 0.01-0.5% |
| inorganic pigments/coloring agents | 1-10% |

As in the first embodiment all the raw materials having a particle size in the range of approximately 63-69 microns are charged together into a grinder cum muller, a commercial ball mill grinder, and milled for approximately 2-3 hours with a finished particle size being in the range of approximately 63-69 microns.

The binders include portland cement, calcium hydroxide and melamine formaldehyde, the fillers include aluminum oxide, aluminum stearate, magnesium oxide and silicon dioxide, the surfactants include oleic acid or salts thereof and the pigments/coloring agents include inorganic synthetic oxides.

As seen in Table 6 compressive strength in psi increases and drying shrinkage decreases as the binder to filler ration, by volume, increases from 0.60 to 0.75.

TABLE 6

| Binder to Filler Ratio By Volume | Compressive Strength-psi 1 day | Compressive Strength-psi 7 days | Drying Shrinkage % |
|---|---|---|---|
| 0.60 | 800 | 4850 | 1.10 |
| 0.65 | 950 | 6400 | 0.96 |
| 0.70 | 1150 | 9200 | 0.71 |
| 0.75 | 1750 | 11450 | 0.38 |

As seen in Table 7 compressive strength in psi increases and drying shrinkage decreases from 0.4 to 0.28 water to cement ration with the optimum binder to filler ration being 0.75 and the optimum water to cement ratio being 0.28.

TABLE 7

| Water to Cement Ratio | Compressive Strength-psi 1 day | Compressive Strength-psi 7 days | Drying Shrinkage % |
|---|---|---|---|
| 0.4 | 800 | 4850 | 1.10 |
| 0.36 | 950 | 6400 | 0.96 |
| 0.32 | 1150 | 9200 | 0.71 |
| 0.28 | 1750 | 11450 | 0.38 |

When used as a finish flooring topper the material can be applied using a dusting method to obtain a ceramic, marble, leather, wood and metallic simulated finish. A half inch bed of cement-sand mortar in a ratio of 1:3 is laid and leveled over a concrete surface for casting in situ, panels of frames of selected dimensions are embedded in the mortar so that only 2-3 mm free standing height extends above the top surface of the mortar. After about 15-20 minutes of laying the mortar, when free water surfaces, a first coating of dry powder is dusted or sprinkled, by hand or trowel, so that it covers most of the mortar surface. After another 10-15 minutes the material absorbs the free water form the cement-sand mortar and becomes wet enough to trowel. When still more water surfaces a second coating of dry powder is dusted onto the surface and when wet enough is troweled. Similarly third and fourth coatings of powder material are added as desired and finally leveled to an extremely smooth finish by troweling very gently with a stainless steel trowel. Various finishes can be created as by using appropriate engraved rollers for leather and wood finishes. For a marble finish the desired colored dry powder is sprinkled very lightly on the surface and troweled very lightly to a smooth finish creating grain effects. A ceramic finish can be obtained by rubbing an extremely smooth stainless steel trowel gently against the surface.

The surface is allowed to set two or three hours, when the surface is sufficiently hard, it is then polished or rubbed gently in a circular motion with a smooth stainless steel trowel. The cast material is allowed to set for a day and subsequently cured with water for approximately 10 to 15 days.

A final finish can be obtained by polishing with 120 grit stone followed by 400-500 grit stone providing an absolutely smooth finish surface. The polishing step is not required for leather and wood finishes, merely washing thoroughly with a liquid soap or soap solution being sufficient. A coating of wax polish or similar material can then be applied on a completely dry and clean surface to obtain a permanent glossy finish - a stainproof, waterproof and easily washable surface.

In order to obtain granite and terrazzo finishes a half inch bed of cement-sand mortar using a ratio of 1:3 is laid and leveled on a concrete surface as in the above described wood, leather, marble and ceramic finishes. For casting in situ the panels or frames of selected material and dimensions are immediately fixed in the mortar leaving the 2-3 mm free standing height. The bed is allowed to set for 2-3 hours. Approximately 900 to 1000 ml of water is added to 5 kg of the topper dry powder and mixed thoroughly. Approximately 100 ml of latex is added to the mix and mixed thoroughly to a homogenous putty which is applied and troweled to a smooth thickness of 2-3 mm. This is allowed to set for 2-3 hours, when the surface is sufficiently hard, the surface is gently rubbed in a circular motion with a smooth stainless steel trowel to obtain an extremely smooth finish. The flooring is allowed to set for a day followed by about two weeks curing with water. The surface is then polished with 120 grit stone followed by 400-500 grit stone to obtain an extremely smooth finish. Finally a coating of wax polish or other comparable material may be applied for a permanent glossy finish after the surface has completely dried. As noted above, in order to optimize strength the water added to the topper material must be kept to the minimum possible amount while still obtaining sufficient workability.

The topper material applied as described above is characterized by having extremely high compressive and flexural strength and has low permeability to water. Surface hardness of the cured material exceeds 4 on Mohr's scale with the material being highly resistant to wear and tear. A wide variety of shades and colors can be provided without problems of pigment bleeding or migration. An unlimited number of finish designs can easily be created with extremely bright and smooth finishes in various simulations, as described above. The material can be laid as a continuous, jointless surface or in frames of any of various materials such as glass, wood, brass or other metals.

When used as a plaster material for upright wall surfaces the plastering step itself serves as the finishing step obviating conventional steps of smooth plastering, lime rendering, application of cement primer and painting. As in the application of the above flooring material, two methods of application are available depending on the desired finish. The first so-called dusting method is suitable for ceramic, marble, leather, wood and metallic simulated finishes. A one half to one inch bed of cement-sand mortar in 1:3 ratio is laid and leveled over a suitable surface such as a brick wall. After 15-20 minutes of laying the mortar, when free water surfaces, a first coating of dry powder (Table 5 material) is applied by dusting by hand or trowel so that it covers most of the mortar surface. After 10-15 minutes the plaster powder material absorbs water from the cement-sand mortar and becomes wet enough to trowel. When more water surfaces a second coat of plaster powder material is applied by dusting. The surface is then leveled to a smooth finish by troweling very gently with a smooth stainless steel trowel. Leather, wood, ceramic, marble and metallic finishes can be obtained in the same manner as described above in relation to the flooring material and need not be repeated.

Once the surface has set for 2-3 hours, when it is hard enough, for ceramic and marble finishes, it is polished very mildly in a circular motion with a smooth stainless steel trowel. The wall is allowed to set for a day and subsequently cured with water for 8-10 days. When the surface is completely dry, eg, about 4 weeks later, a permanent glossy finish can be obtained by applying a finish coating of wax or the like as set forth in relation to the topper material described above.

For a granite and terrazzo simulated finish a one half to one inch bed of cement-sand mortar in 1:3 proportions is laid and leveled over a suitable surface, such as a brick wall. The bed is allowed to set for two hours. Approximately 1000 to 1100 ml of water and 100 ml of latex are thoroughly mixed with 5 kg of dry powder (Table 5 Material) to a homogenous paste and then applied and troweled to a smooth finish of approximately 2 mm thickness. This is allowed to set for 2-3 hours when the surface is sufficiently hard and then the surface is gently rubbed in a circular motion with a smooth stainless steel trowel. The wall is allowed to set for a day and then cured with water for approximately 7-10 days after which it is polished with 400-500 grit sand paper and washed with a soap solution. For a mirror like finish when the surface is completely dry, eg, in about 4 weeks, a finish coating as set forth in the first embodiment of the invention can be applied.

As noted in relation to the flooring material, in order to obtain optimum results the water added to the powder material must be the minimum possible to obtain the required workability of the mortar and must be very thoroughly, homogenously mix.

A wall surface applied as described above is available in a variety of permanent shades and colors without having problems of bleeding or fleeting in various finishes and unlimited patterns. The material has low permeability to water and had a surface hardness in excess of 3 on the Mohr scale.

The compositions of the instant invention are useful for a wide variety of applications. The composition for paint greatly reduces the portland cement content obviating environmental concerns and efforescence as well as promoting workability for applying the material eliminating surface non-uniformity problems on rough masonry surfaces having cracks, voids and poor joints and provides greatly increase surface area coverage resulting in a lower cost product per unit of area of coverage. The compositions provide finishes of various types with improved durability and bond strength. Peel resistance is enhanced by a factor of five or even higher compared to conventional cement based materials.

It should be understood that though preferred embodiments of the invention have been described by way of illustrating the invention, this invention includes all modifications and equivalents of the disclosed embodiments falling within the scope of the appended claims.

We claim:

1. A composition for forming cement finishing materials comprising, by weight, 12-25% portland cement, 25-35% calcium hydroxide, 12-16% magnesium oxide, 25-32% silicon dioxide, 1-3% zinc oxide, 0.5-3% aluminum stearate, 0.05-3% melamine formaldehyde, and 0.5-10% coloring agents.

2. A composition for forming cement finishing materials according to claim 1 in which the portland cement comprises approximately 15%.

3. A composition for forming cement finishing materials according to claim 1 in which the calcium hydroxide comprises approximately 30%.

4. A composition for forming cement finishing materials according to claim 1 comprising the following: portland cement approximately 15%, calcium hydroxide approximately 30%, magnesium oxide approximately 13%, zinc oxide approximately 2%, and aluminum stearate approximately 2%.

5. A composition for forming cement finishing materials according to claim 1 in which the ingredients are between approximately 63-69 microns in particle size.

6. A composition for forming cement finishing materials comprising by weight, 12-25% portland cement, 25-35% calcium hydroxide, 0.05-3% melamine formaldehyde as binders and 12-16% magensium oxide and 25-32% silicon dioxide as fillers, all having a particle size no larger than approximately 69 microns.

7. A composition for forming cement finishing materials comprising, by volume, 55-70% white portland cement, 13-25% calcium hydroxide, 2-5% magnesium oxide, 3-8% silicon dioxide, 1-4% aluminum oxide, 1-3% aluminum stearate, 0.005-1% melamine formaldehyde, 1–10% oxide pigments for inorganic coloring and 0.01–0.5% surfactants.

8. A composition for forming cement finishing materials comprising, by volume, 55–70% portland cement, 13–25% calcium hydroxide and 0.005–1% melamine formaldehyde as binders, 2–5% magnesium oxide, 3–10% silicon dioxide, 1–4% aluminum oxide, and 1–3% aluminum stearate as fillers, and 0.01–0.5% surfactants.

* * * * *